PULSE INSERTION CIRCUIT FOR DETECTING MISSING PULSES AND FOR INSERTING LOCALLY GENERATED, SYNCHRONIZED PULSES THEREFOR
Filed June 12, 1962
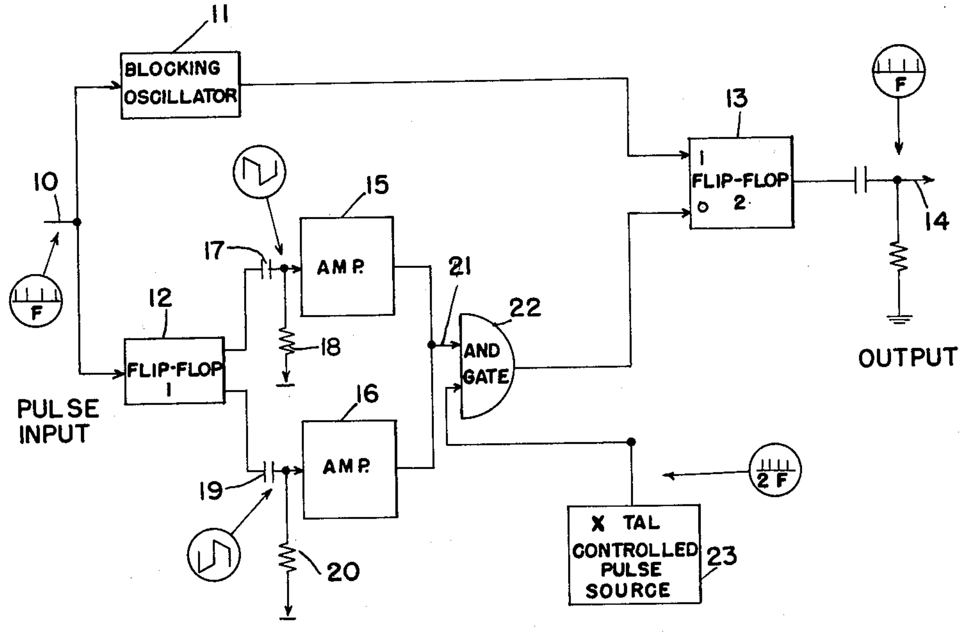
INVENTOR.
ALAN BARRY JOHNSON
BY S. J. Rotondi, A. J. Dupont & S. Dubroff
ATTORNEYS:

United States Patent Office 3,153,762

Patented Oct. 20, 1964

3,153,762

PULSE INSERTION CIRCUIT FOR DETECTING MISSING PULSES AND FOR INSERTING LOCALLY GENERATED, SYNCHRONIZED PULSES THEREFOR

Alan Barry Johnson, Framingham, Mass., assignor, by mesne assignments, to the United States of America as represented by the Secretary of the Army Filed June 12, 1962, Ser. No. 202,033
4 Claims. (Cl. 328—63)

This invention relates to pulse insertion systems. It provides an improved pulse synthesizing system which functions to substitute a synthesized pulse for a pulse which has been dropped out or omitted from a series of constant repetition rate pulses designed to effectuate operation of a load device or the like.

It is known that a signal consisting of pulses having a constant repetition rate may be utilized to control or actuate devices of various kinds. Where such pulses are recorded on and reproduced from a magnetic tape, it sometimes happens that an occasional one of said pulses are not reproducible. This is objectionable for the reason that it interferes with the operation of the controlled or actuated device. The present invention overcomes this difficulty by the provision of a simple and reliable means for substituting a synthesized pulse for each pulse not reproducible from the magnetic tape or other recording media.

The invention will be better understood from a consideration of the following description in connection with the appended drawing and its scope is indicated by the appended claims.

The single figure of the drawing is a block diagram indicating the relation between the various elements of the system all of which are well known.

The system includes an input lead 10 to which the constant repetition rate pulses are applied. This lead is connected to the input of a blocking oscillator 11 and to the input of a multivibrator or flip-flop 12, which may be a solid state flip-flop or the like. Output from the blocking oscillator 11 is applied to a multivibrator or flip-flop 13 which may be a solid-state device and which reproduces the pulses at an output lead 14.

While the pulses are thus reproduced, the multivibrator or flip-flop 12 is functioning through R-C coupling circuits 17–18 and 19–20 to energize a pair of amplifiers 15 and 16 in push-pull. These amplifiers have a common output lead 21 which is connected to the control element of an "AND" gate 22 as one input signal source. This gate also completes a connection between the multivibrator or flip-flop 13 and a crystal controlled generator 23 only when the amplifiers 15 and 16 are deenergized. These amplifiers are deenergized only when an input pulse is omitted and the multivibrator or flip-flop 12 ceases to operate, the constants of the R-C circuits 17–18 and 19–20 being such that the amplifiers reach cut off condition within one-half the period of the input signal.

In connection with the operation of the system it is to be understood that (1) an output pulse is delivered to the lead 14 only when the multivibrator or flip-flop 13 is triggered from the "one" to the "zero" state, (2) the generator 23 operates at twice the repetition frequency of the signal applied to the input lead 10, and (3) any pulse applied from the generator 23 to the multivibrator or flip-flop 13 sets this device to its "one" state. Under these conditions, the generator 23 and the multivbrator or flip-flop 13 are disconnected so long as a pulse is not omitted. When a pulse is omitted, however, the "AND" gate 22 functions to connect the generator to flip-flop 13 long enough to operate it to its "zero" state so that a synthesized pulse is thereupon substituted for the omitted input pulse. Since an output is taken from the multivibrator or flip-flop 13 only when it is triggered from its "one" state, the output is synchronized with the signal delivered to the input lead 10. While the elements 12 and 13 are herein designated as multivibrators, it will be readily appreciated by those skilled in the art that they are effectively gates and may be relays, solid state flip-flops or other similar devices which are capable of providing the desired response to the signals appearing at their input leads.

The internal circuitry of the flip-flops 12 and 13 for single and double input, respectively, may be arranged in any known manner to operate as above. For example, they may be arranged as shown in the Handbook of Automation, Computation and Control, vol. II, chapter 16, pages 26 and 27, as published by John Wiley & Sons, 1959 edition.

FIG. 22(*a*) shows the device 13 using only the "zero" output at 14 (the "one" output lead being not brought out or used in the present system) and FIG. 22(*c*) shows the device 12 as it also can be constructed and used in the present system.

The operation is as follows: The pulses from the signal source at the circuit 10 trigger the blocking oscillator 11, which, in turn, sets the flip-flop 13 to the "zero" state. The signal output of the generator 23, which is at twice the repetition frequency of the incoming signal at 10, is used to set the flip-flop 13 to the "one" state. Since an output signal is taken from this flip-flop only when it is triggered from the "one" state to the "zero" state, the output will be synchronized with the signal applied from the input circuit 10. This may be derived from magnetic tape, for example.

The input signal also triggers the flip-flop 12. This inhibits the "AND" gate 22 through which the crystal-controlled pulse source is connected to the "zero" input circuit of the flip-flop 13. In normal operation, one of the amplifiers 15 and 16, which are driven in push-pull relation by the flip-flop 12, is always conducting. Since the amplifier output circuits are connected in common, the "AND" gate 22 is always inhibited.

When a dropout in the input signal continuity occurs, that is, when instantaneous signal dropout or loss occurs, the flip-flop 12 ceases to operate and the R-C coupling circuits 17 and 19 then discharge so that both amplifiers 15 and 16 cut off and the "AND" gate 22 is enabled. This allows the crystal-controlled pulse source to trigger the flip-flop 13 in a complementary manner in order to produce the synthesized or restored output signal. The R-C circuit time constants are selected such that the amplifiers return to the cut off condition within one-half the period of the tape or input signal.

I claim:

1. A system for inserting an omitted pulse in a series of constant-repetition-rate pulses, comprising in combination means for reproducing said constant-repetition-rate pulses, means for generating a control pulse having a repetition rate twice that of said constant-repetition-rate pulses, and means energized by said constant-repetition-rate pulses to apply said control pulse to said reproducing means only when one of said constant-repetition-rate pulses is omitted.

2. A system according to claim 1, wherein said pulse reproducing means are a blocking oscillator followed by and connected with a flip-flop.

3. A system according to claim 1, wherein said control pulse generating means is a crystal-controlled generator.

4. A system according to claim 1, wherein said means for applying said control pulse to said reproducing means includes a flip-flop, a pair of amplifiers driven in push-pull from the output of said flip-flop and coupled thereto through resistance-capacitance circuits having time constants such that said amplifiers return to cut off within one-half the period of said constant repetition rate pulses, and an "AND" gate connected to transmit said control pulse to said reproducing means only when said amplifiers are cut off.

References Cited in the file of this patent

UNITED STATES PATENTS 2,980,858 Grondin et al. ---------- Apr. 18, 1961
3,080,487 Mellott et al. ------------ Mar. 5, 1963